United States Patent
Mönkkönen

[11] Patent Number: 5,906,249
[45] Date of Patent: May 25, 1999

[54] DRIVE SYSTEM OF A DRIVE WHEEL

[75] Inventor: Markku Tapio Mönkkönen, Kuuslahti, Finland

[73] Assignee: Orion-Yhtymä Oy, Peltosalmi, Finland

[21] Appl. No.: 08/894,584

[22] PCT Filed: Dec. 22, 1995

[86] PCT No.: PCT/FI96/00643

§ 371 Date: Aug. 22, 1997

§ 102(e) Date: Aug. 22, 1997

[87] PCT Pub. No.: WO97/23363

PCT Pub. Date: Jul. 3, 1997

[30] Foreign Application Priority Data

Dec. 22, 1995 [FI] Finland .................................. 956212

[51] Int. Cl.$^6$ ............................................... B60K 1/00
[52] U.S. Cl. ......................................... 180/292; 180/65.6
[58] Field of Search .................................. 180/291, 292, 180/65.5, 65.6, 65.7, 312; 280/400, 405.1

[56] References Cited

FOREIGN PATENT DOCUMENTS

| | | |
|---|---|---|
| 0509221 | 10/1992 | European Pat. Off. . |
| 0562122 | 9/1993 | European Pat. Off. . |
| 0749862 | 12/1996 | European Pat. Off. . |
| 841707 | 10/1985 | Finland . |
| 2469296 | 5/1981 | France . |
| 3507232 | 9/1986 | Germany . |
| 3536647 | 4/1987 | Germany . |
| 1389740 | 4/1975 | United Kingdom . |
| 9524325 | 9/1995 | WIPO . |

*Primary Examiner*—Richard M. Camby
*Attorney, Agent, or Firm*—Steinberg & Raskin, P.C

[57] ABSTRACT

A drive system for a drive wheel of a vehicle having a hub. The drive system includes a frame, a sun gear including toothing on an outer surface, a motor arranged to rotate the sun gear via an output shaft, a revolving circular, a peripheral gear including toothing on an inner surface, and planetary gears interposed between the sun gear and the peripheral gear and engaging with the toothing of the sun gear and the toothing of the peripheral gear. Each planetary gear has a shaft connecting to the hub of the vehicle. A rotatable sleeve shaft surrounds at least a part of the output shaft and has a toothing on an outer surface. The peripheral gear is arranged relative to the sleeve shaft such that the toothing of the peripheral gear engages with the toothing of the sleeve shaft. A clutch/brake element is arranged between the sleeve shaft and the frame for controlling rotation of the sleeve shaft. The clutch/brake element has a first engaged position in which it is engaged such that the sleeve shaft is not rotatable and thus locked so that when the motor is in operation, motive force is passed to the wheel and when the motor is not in operation, the wheel is being braked, and a second position in which it is not engaged such that the sleeve shaft is rotatable so that when the motor is not in operation, the wheel is in a freely revolving state.

20 Claims, 3 Drawing Sheets

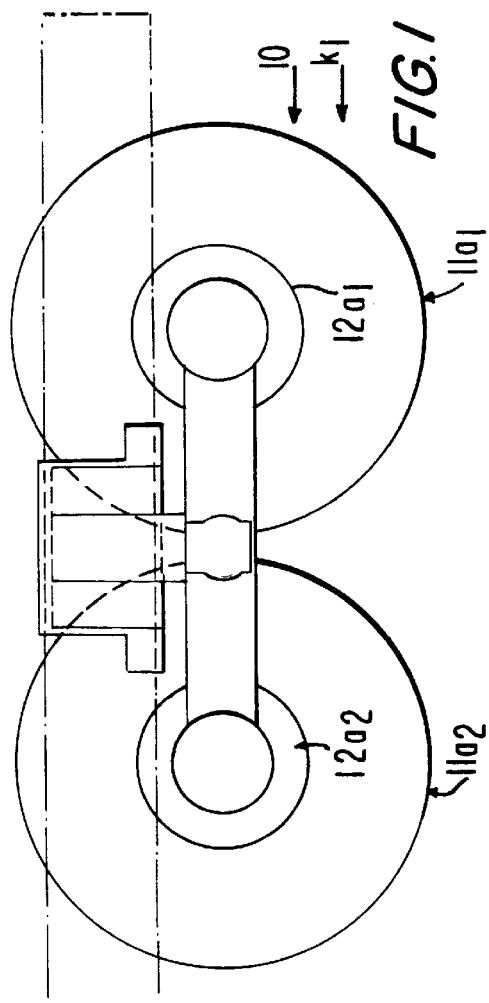
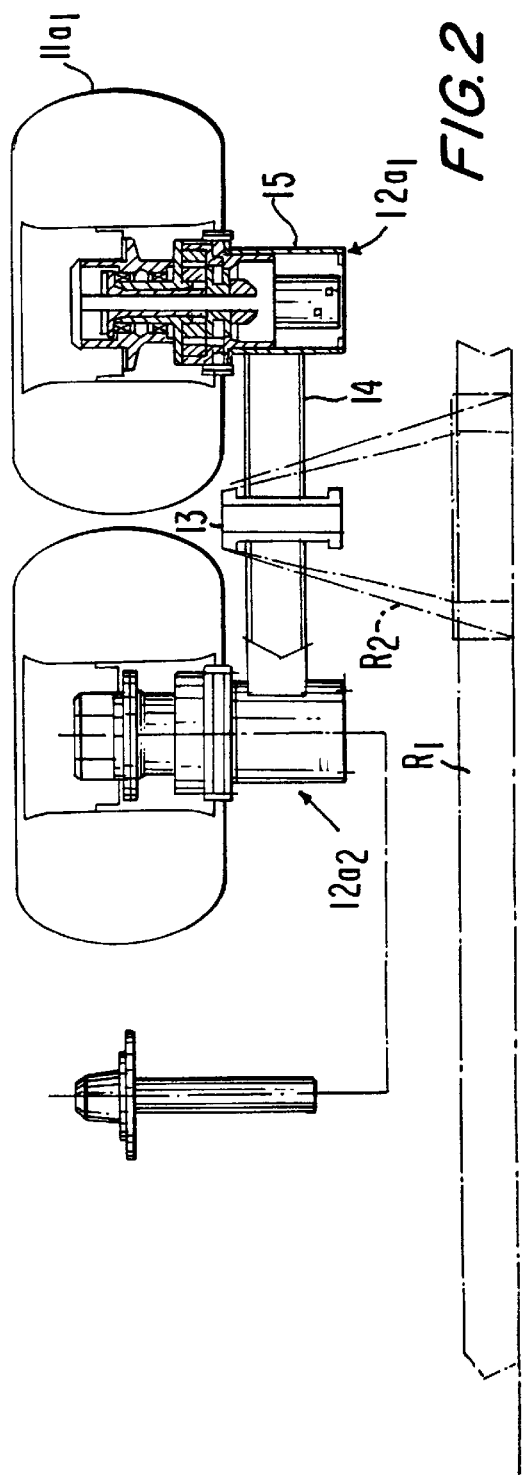
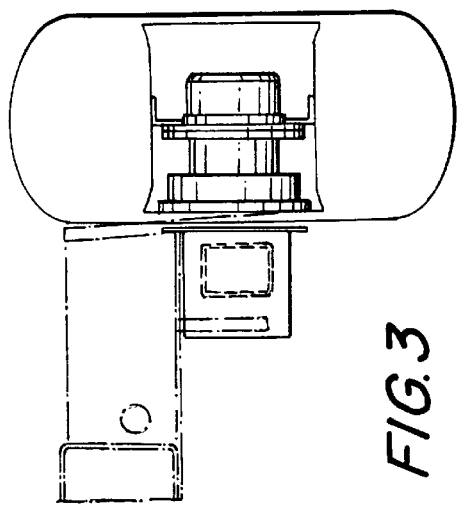

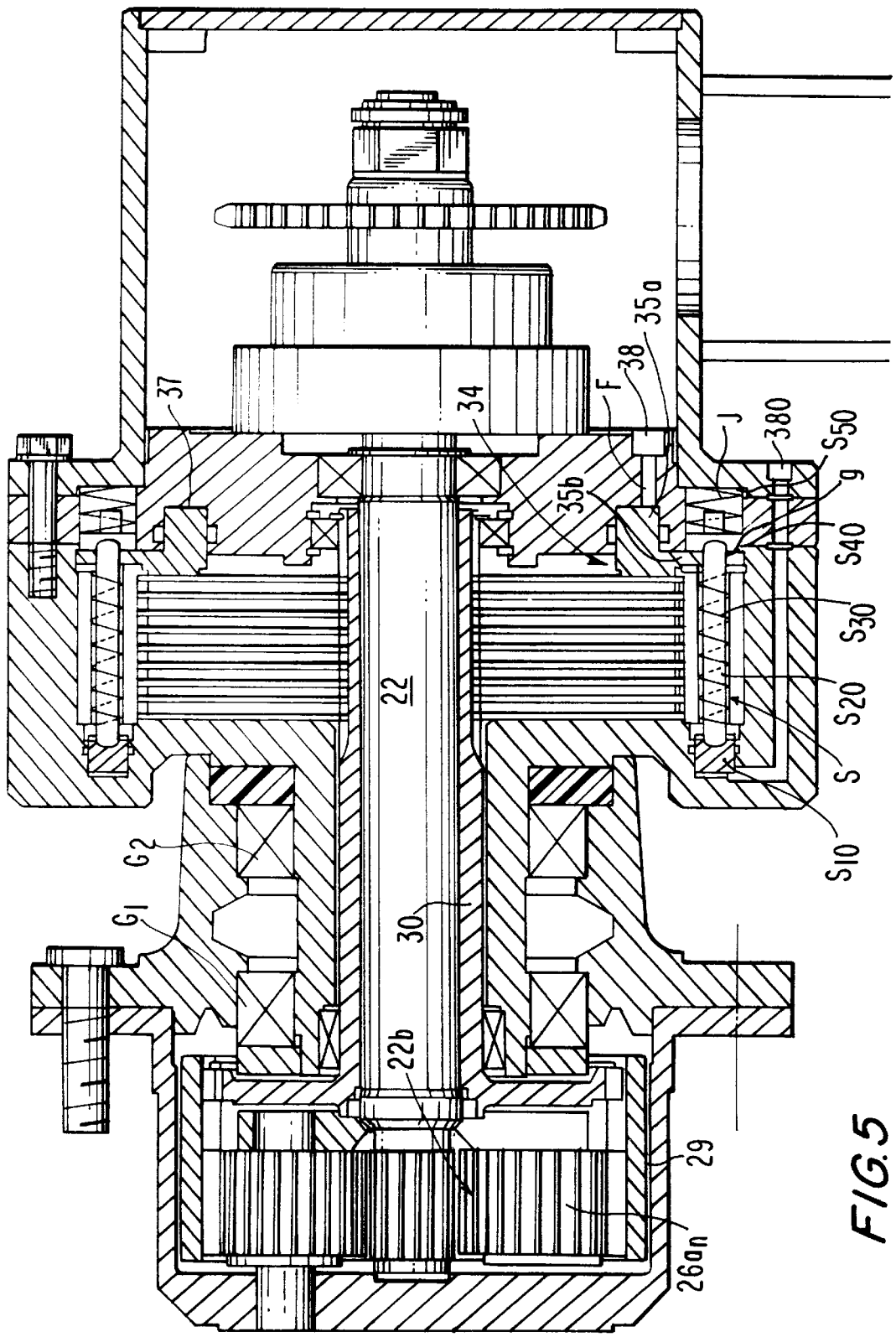

DRIVE SYSTEM OF A DRIVE WHEEL

FIELD OF THE INVENTION

The invention concerns a drive system of a drive wheel, which is suitable in particular for vehicles and their trailers as an auxiliary drive system for a drive wheel/drive wheels.

BACKGROUND OF THE INVENTION

From the EP Patent Application 0,562,122, a drive system for a wheel of a vehicle is known in which a motor is fitted to rotate planetary gears through its output shaft and which system comprises a stationary peripheral gear. A braking element is fitted between a stationary frame and the frame of the wheel hub which is fitted to revolve. The construction of this solution is rather complex, because the positioning of the brake element requires space. Also, it is a drawback of the drive system that in the free run position the shaft of the hydraulic motor is still rotated, and said rotation can be disengaged exclusively if a separate coupling is provided between the output shaft of the motor and the shaft that operates the central sun gear.

SUMMARY OF THE INVENTION

In the present application, a simple drive system for a drive wheel is suggested in which the drawbacks mentioned above are avoided. In the present invention, it has been realized to use a planetary gear system in which the peripheral gear is operationally connected with a clutch. In the construction in accordance with the invention, the clutch is fitted between a sleeve shaft that acts upon the peripheral gear and the motor frame. In the system, the motor is fitted, in a way in itself known, to operate the planetary gears, and the planetary gears are coupled with the wheel hub. According to the invention, when the wheel is driven and when the drive is passed to the wheel, both the clutch is engaged and the shaft of the motor is switched on to revolve. Thus, when the clutch is engaged, the outer peripheral gear is kept locked and the drive is transferred through the planetary-gear frame to the wheel hub.

When braking is operated, the motor is switched off and locked, and the clutch/brake is kept engaged. Then, the clutch operates as the brake and carries out the braking of the wheel. Thus, the braking does not produce any torque in the hydraulic motor.

In free operation, both the clutch is kept in the free position and the hydraulic motor is kept non-operated.

The drive system in accordance with the invention is mainly characterized in that the peripheral gear is fitted to revolve, and the toothing on the peripheral gear is connected with a separate sleeve shaft, which is fitted to surround the output shaft rotated by the motor, and that the sleeve shaft is journalled to revolve, and that there is a clutch/brake element between said sleeve shaft and the frame, in which case, when the clutch is engaged and when the motor is in operation, the drive is passed to the wheel, and when the motor has been connected out of operation and the clutch is engaged, the wheel is being braked, and when neither the clutch is engaged nor the motor is in operation, the wheel is in the freely revolving state.

BRIEF DESCRIPTION OF THE DRAWINGS

The invention will be described in the following with reference to some preferred embodiments of the invention illustrated in the figures in the accompanying drawings, the invention being, however, not supposed to be confined to said embodiments alone.

FIG. 1 is a side view of a bogie construction of a trailer.

FIG. 2 shows the construction of FIG. 1 viewed from above.

FIG. 3 shows the bogie construction viewed in the direction of the arrow $k_1$ in FIG. 1.

FIG. 5 shows an embodiment of the invention which is in the other respects similar to the embodiment shown in the former figures but in which the brake operation is different.

DETAILED DESCRIPTION OF THE PREFERRED EMBODIMENTS

Figure 4:
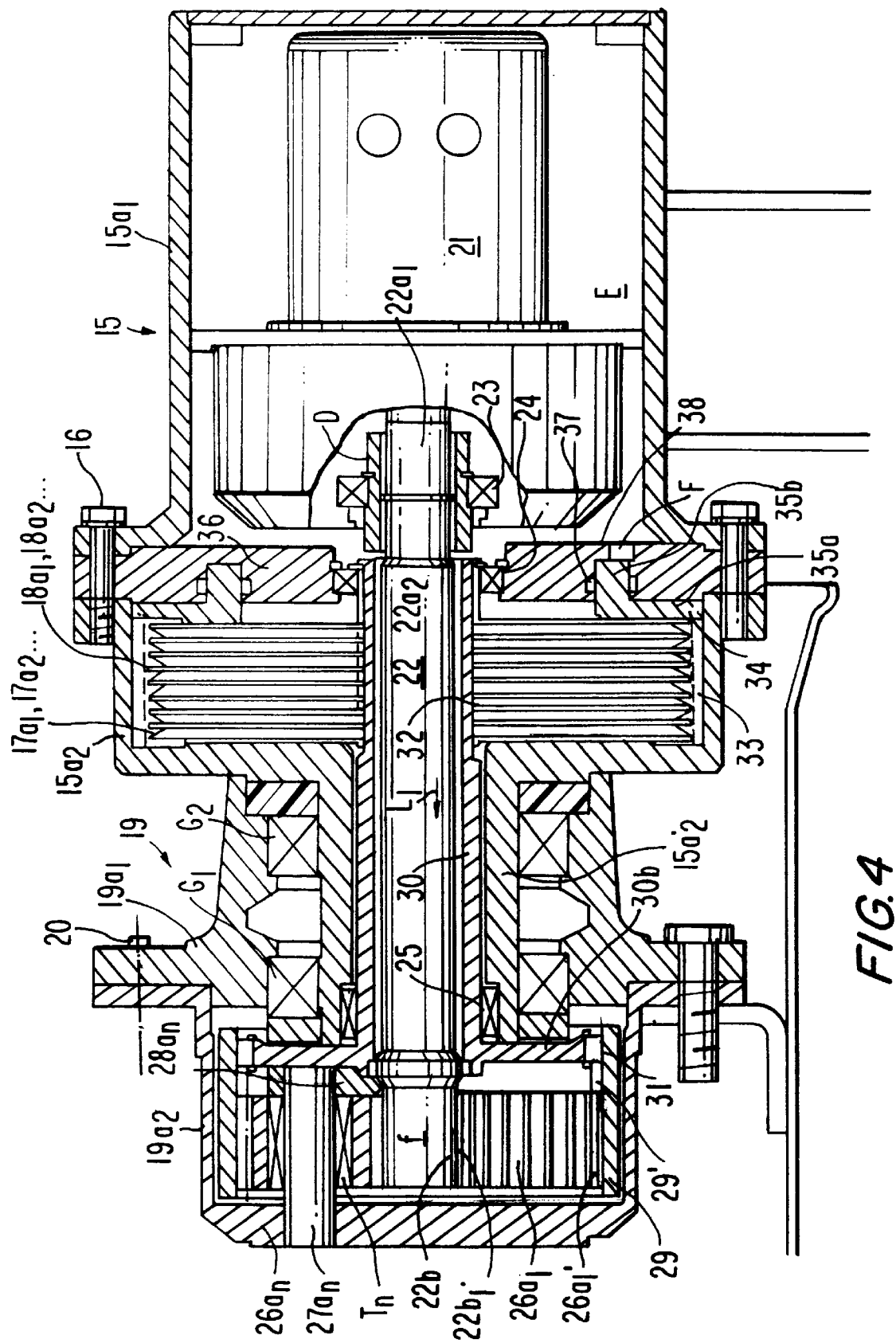
FIG. 4 shows a hydraulic drive system in accordance with the invention, being a sectional view of a hydraulic-motor planetary-gear assembly.

FIG. 1 shows the bogie 10 at one side of the trailer of a vehicle, comprising the wheels $11a_1$ and $11a_2$ in the bogie construction. For each wheel $11a_1$, $11a_2$ there can be a separate wheel drive $12a_1$ and $12a_2$ of its own. It is also possible that one wheel $11a_1$ or $11a_2$ only is provided with a separate wheel drive. Said wheel drives $12a_1$, $12a_2$ are preferably auxiliary drive systems, which can be switched off when necessary, in which case the wheel drives are in the free position. By means of said wheel drives $12a_1$ and $12a_2$ it is also possible to carry out braking of the vehicle.

FIG. 2 shows the wheel drive system shown in FIG. 1 as viewed from above. The bogie 10 comprises a swing shaft 13 connected with the suspension $R_2$ of the bogie mounted on the chassis beam $R_1$. The swing shaft 13 is connected with a swing beam 14, which includes the wheels $11a_1$ and $11a_2$ at both ends, together with separate motor drives $12a_1$ and $12a_2$ for said wheels. The swing beam 14 is fitted to pivot on support of the swing shaft 13.

Each motor drive $12a_1$, $12a_2$ comprises a box 15 connected with the swing beam 14, in whose interior, in the protected space E, there is a hydraulic motor 21.

FIG. 3 shows the solution of equipment viewed in the direction of the arrow $k_1$ in FIG. 1.

FIG. 4 is a sectional view on an enlarged scale of a wheel drive $12a_1$ in accordance with the invention. Said hydraulic auxiliary drive system for a drive wheel of a vehicle, trailer, or equivalent comprises a box-like frame 15 connected with the swing beam 14 of the bogie 10, which frame comprises a first frame part $15a_1$ and a second frame part $15a_2$ connected with said first frame part by means of screws 16. The wheel hub 19 is mounted to revolve on bearings $G_1$ and $G_2$ on the frame part $15a_2$ of the frame 15.

The wheel hub 19 comprises a first frame part $19a_1$ and a second, outer frame part $19a_2$ connected with said first frame part by means of screws 20, and the outer frame part $19a_2$ is connected with the rim of the wheel $11a_1$.

The motor 21 is placed inside the first frame part $15a_1$ of the frame 15 in the space E and is fixed to the frame $15a_1$. The hydraulic motor 21 is fitted to rotate the output shaft 22. The output shaft 22 comprises a first shaft part $22a_1$ and a second shaft part $22a_2$, which comprise, at their ends placed one against the other, grooves or equivalent, from which the shafts are connected with the sleeve D that surrounds them, which sleeve D comprises corresponding inside grooves. The sleeve D is further mounted revolving by means of bearing means 23. Thus, when the shaft 22 is rotated, the sleeve D is also rotated. At the outer end f of the shaft part $22a_2$ of the output shaft 22 of the motor 21, there is a sun gear 22b formed out of said end f and comprising a circumferential toothing $22b'$. The arrangement of equipment further comprises planetary gears $26a_1 \ldots 26a_n$, each of which comprises a toothing $26a_1',26a_2'$, which is in engagement both with the toothing $22b'$ on the sun gear $22b$ of the shaft 22 and with the inner toothing $29'$ on an outer peripheral gear 29. Each planetary gear $26a_1 \ldots 26a_n$ comprises a shaft $27a_1,27a_2 \ldots$ and a planetary-gear frame $28a_1,28a_2 \ldots$. Each shaft $27a_1,27a_2 \ldots$ is permanently connected with the hub 19. The planetary gear $26a_1 \ldots 26a_n$ is fitted to revolve around its shaft $27a_1,27a_2 \ldots$ by means of the bearing means $T_1,T_2$.

In the drive system in accordance with the invention, the wheel hub 19 of the vehicle is connected expressly with the planetary gears $26a_1 \ldots 26a_n$. On the contrary, the revolving peripheral gear 29, which is in engagement with the planetary gears $26a_1 \ldots 26a_n$, is connected with the outside sleeve shaft 30 that surrounds the shaft 22 from the flange $30b$, from the circumferential toothing 31 on the flange $30b$, or equivalent. The sleeve shaft 30 is mounted by means of bearing means 25 and 24 so that it revolves in relation to the box frame part $15a_2$ of the box frame 15. The bearing 25 is placed between the tubular extension $15a_2'$ of the frame part $15a_2$ and the sleeve shaft 30. The bearings 24 are placed between the sleeve shaft 30 and the flange 36. The sleeve shaft 30 further comprises outside grooves 32 or equivalent, with which the clutch plates $17a_1 \ldots 17a_n$ of the clutch 100 are connected operationally. The other clutch plates $18a_1 \ldots 18a_n$, which are placed as interlocked with said first clutch plates, are connected with inside grooves 33 or equivalent in the frame $15a_2$. The press disk 34 that presses the clutch plates of the system is connected with the flange 36 which extends into the interior of the box frame 15 so that the press disk 34 comprises a projection ring $35b$ projecting from the flange part $35a$, which ring $35b$ is placed in a ring groove 37 in the flange 36. To the outer face F of the projection ring $35b$ of the press disk 34, there is a pressure medium connection through the opening 38 in the flange 36. Thus, the operation of the clutch 100 when the traction is switched on or when the braking is switched on takes place by applying the pressure of a medium, for example hydraulic fluid, to the face F of the projection ring $35b$. In such a case, the package of plates $17a_1 \ldots 17a_n; 18a_1 \ldots 18a_n$ is shifted in the direction of the arrow $L_1$ and the plates are locked in relation to one another and, thus, the sleeve shaft 30 is locked in relation to the frame 15. In such a case, the peripheral gear 29 is locked.

By means of the device in accordance with the invention, a smooth free running of the auxiliary power transmission independent from the speed of rotation is obtained. During the free running, the hydraulic motor does not revolve. During braking, a dynamic braking dependent on the braking pressure is obtained.

When the auxiliary power transmission is switched on, the flow of fluid is passed to the hydraulic motor. At the same time, the engagement pressure is passed to the clutch/brake element. If attempts are made to operate the motor 21 with an excessively high pressure, the clutch/brake element operates as a torque limiter.

During braking, the hydraulic motor is locked and braking pressure is passed to the clutch/brake element 100 so as to produce dynamic braking dependent on the braking pressure.

Free rotation is accomplished so that the hydraulic motor is kept free of pressure and mechanically or hydraulically locked, and the clutch/brake element 100 is kept disconnected.

As is shown in FIG. 5, the construction is in the other respects similar to those of the embodiments described above, but the brake unit comprises a separate brake cylinder S. When the brake cylinder S is free from pressure, the spring J of the brake cylinder locks the plates $17a_1,17a_2 \ldots ;18a_1,18a_2 \ldots$, and then the braking takes place when the central shaft is not rotated and its rotation has been locked. When no pressure is passed into the operation duct 380 of the brake cylinder S of the brake plates, the set of gears is locked, provided that, additionally, the shaft 22 is non-revolving and, for example, its drive gear, i.e. the motor 21, is in the locked state. Thus, in this system, the locking in respect of the plates $17a_1,17a_2 \ldots ;18a_1,18a_2 \ldots$ is always switched on when no pressurized medium, such as hydraulic fluid, is passed into the duct 380 of the brake cylinder S and, thus, when no control pressure is passed to the brake cylinder S. The plates are kept locked in relation to one another by the spring J at the end of the brake cylinder S. Thus, the system is safe. When pressure is passed into the duct 380, it acts upon the piston part $S_{10}$ of the brake cylinder S, which piston part is connected with a spindle $S_{20}$, which is surrounded by a press spring $S_{30}$. The spindle $S_{20}$ is passed through an opening g in the flange part $35b$ of the press disk 34, and it is fitted to act upon the piston part $S_{40}$. The piston part $S_{40}$ is further acted upon by the spring J between the piston part $S_{40}$ and the end part $S_{50}$ of the frame. Thus, when pressure acts upon the piston part $S_{10}$ through the medium duct 380, the spindle $S_{20}$ connected with the piston part $S_{10}$ is displaced so that it acts upon the piston part $S_{40}$ and releases the press disk 34 from the force of the spring J, whereby the plates $17a_1 \ldots 17a_n;18a_1 \ldots 18a_n$ become free. If no pressure is passed into the duct 380, the spring $S_{30}$ placed around the rod $S_{20}$ presses the piston part $S_{10}$ into its original position, and the spring J acts upon the piston part $S_{40}$, which further applies the force to the flange part 35 of the press disk 34, whereby the plates $17a_1 \ldots 17a_n;18a_1 \ldots 18a_n$ in the package of plates are locked in relation to one another.

I claim:

1. A drive system for a drive wheel of a vehicle, the wheel having a hub, comprising a frame, a sun gear including toothing on an outer surface, a motor for rotating said sun gear, said motor having an output shaft coupled to said sun gear, a revolving peripheral gear including toothing on an inner surface, planetary gears arranged to revolve between said sun gear and said peripheral gear and engaging with the toothing on said outer surface of said sun gear and the toothing on said inner surface of said peripheral gear, each of said planetary gears having a shaft adapted to be connected to the hub of the vehicle, a revolving sleeve shaft surrounding said output shaft, said sleeve shaft having a toothing on an outer surface, said peripheral gear being arranged relative to said sleeve shaft such that the toothing on the inner surface of said peripheral gear engages with the toothing on the outer surface of said sleeve shaft, and a clutch/brake element arranged between said sleeve shaft and said frame for controlling rotation of said sleeve shaft, said clutch/brake element having a first engaged position in which said clutch/brake element is engaged such that said sleeve shaft is not rotatable and thus locked so that when said motor is in operation, motive drive is passed to the wheel and when said motor is not in operation, the wheel is being braked, and a second position in which said clutch/brake element is not engaged such that said sleeve shaft is rotatable so that when said motor is not in operation, the wheel is in a freely revolving state.

2. The drive system of claim 1, wherein the hub comprises a first frame portion surrounding said peripheral gear and a second frame portion, said frame comprising a first frame part housing said motor and a second frame part having a tubular extension adapted to be in opposed relationship to said second frame portion of the hub, further comprising first bearing means for revolvingly supporting said frame arranged between said second frame portion of the hub and said tubular extension of said second frame part of said frame, second bearing means for revolvingly supporting said sleeve shaft arranged between said tubular extension of said second frame part of said frame and said sleeve shaft, a flange connected to said frame and extending inwardly into an interior of said frame, and third bearing means for revolvingly supporting said sleeve shaft arranged between said flange and said sleeve shaft.

3. The drive system of claim 1, wherein said sleeve shaft is elongate and comprises an outwardly extending flange at one end, the toothing on said sleeve shaft being arranged on an outer circumferential surface of said flange.

4. The drive system of claim 1, wherein said frame comprises a first frame part housing said motor and a second frame part having a tubular extension adapted to be in opposed relationship to said second frame portion of the hub, said clutch/brake element including clutch plates, further comprising a flange arranged between said first and second frame parts and extending inwardly into an interior of said frame, said flange comprising an annular groove and an opening leading into said annular groove through said flange, and a press disk having a projection ring arranged in said annular groove of said flange, said flange and press disk being arranged such that a pressure medium passing through said opening in said flange acts upon an outer face of said projection ring and moves said press disk to cause said clutch plates to shift against one another.

5. The drive system of claim 4, wherein said sleeve shaft has grooves on an outer surface thereof and said second frame part of said frame has grooves on an inner surface thereof, said clutch plates comprising a first set of clutch plates connected to said grooves on said sleeve shaft and a second set of clutch plates connected to said grooves on said second frame part of said frame such that shifting of said clutch plates against one another prevents rotation of said sleeve shaft.

6. The drive system of claim 4, wherein said clutch/brake element further comprises a brake cylinder arranged in said frame, said brake cylinder having a spindle, a spring interposed between said press disk and said frame, and duct means arranged in connection with said frame for providing a pressure medium to acts on said spindle to release the effect of the spring force of said spring on said press disk.

7. The drive system of claim 6, wherein said brake cylinder further comprises first and second piston parts connected to a respective end of said spindle, said second piston part being arranged between said press disk and said spring, said projection ring having an opening through which said spindle extends to engage said second piston part.

8. The drive system of claim 1, wherein the vehicle has a bogie having a swing beam pivotable in relation to a chassis of the vehicle, said frame being connected to the swing beam and having an interior in which said motor is arranged.

9. In a drive system for a drive wheel of a vehicle, the wheel having a hub and the drive system including a frame, a sun gear including toothing on an outer surface, a motor having an output shaft coupled to said sun gear and being arranged to rotate said sun gear via said output shaft, a revolving circular, peripheral gear including toothing on an inner surface, planetary gears interposed between said sun gear and said peripheral gear and engaging with the toothing on said outer surface of said sun gear and the toothing on said inner surface of said peripheral gear, each of said planetary gears having a shaft connected to the hub of the vehicle, the improvement comprising a rotatable sleeve shaft surrounding at least a part of said output shaft, said sleeve shaft having a toothing on an outer surface, said peripheral gear being arranged relative to said sleeve shaft such that the toothing on the inner surface of said peripheral gear engages with the toothing on the outer surface of said sleeve shaft, and a clutch/brake element arranged between said sleeve shaft and said frame for controlling rotation of said sleeve shaft, said clutch/brake element having a first engaged position in which said clutch/brake element is engaged such that said sleeve shaft is not rotatable and thus locked so that when said motor is in operation, motive force is passed to the wheel and when said motor is not in operation, the wheel is being braked, and a second position in which said clutch/brake element is not engaged such that said sleeve shaft is rotatable so that when said motor is not in operation, the wheel is in a freely revolving state.

10. The drive system of claim 9, wherein the hub comprises a first frame portion surrounding said peripheral gear and a second frame portion, said frame comprising a first frame part housing said motor and a second frame part having a tubular extension in opposed relationship to said second frame portion of the hub, further comprising first bearing means for revolvingly supporting said frame arranged between said second frame portion of the hub and said tubular extension of said second frame part of said frame, second bearing means for revolvingly supporting said sleeve shaft arranged between said tubular extension of said second frame part of said frame and said sleeve shaft, a flange connected to said frame and extending inwardly into an interior of said frame, and third bearing means for revolvingly supporting said sleeve shaft arranged between said flange and said sleeve shaft.

11. The drive system of claim 10, wherein said sleeve shaft is elongate, said second bearing means being arranged at one end of said sleeve shaft and said third bearing means being arranged at an opposite end of said sleeve shaft.

12. The drive system of claim 9, wherein said sleeve shaft is elongate and comprises an outwardly extending flange at one end, the toothing on said sleeve shaft being arranged on an outer circumferential surface of said flange.

13. The drive system of claim 9, wherein said frame comprises a first frame part housing said motor and a second frame part having a tubular extension in opposed relationship to said second frame portion of the hub, said clutch/brake element including clutch plates, further comprising a flange arranged between said first and second frame parts and extending inwardly into an interior of said frame, said flange comprising an annular groove and an opening leading into said annular groove through said flange, and a press disk having a projection ring arranged in said annular groove of said flange, said flange and press disk being arranged such that a pressure medium passing through said opening in said flange acts upon an outer face of said projection ring and moves said press disk to cause said clutch plates to shift against one another.

14. The drive system of claim 13, wherein said sleeve shaft has grooves on an outer surface thereof and said second frame part of said frame has grooves on an inner surface thereof, said clutch plates comprising a first set of clutch plates connected to said grooves on said sleeve shaft and a second set of clutch plates connected to said grooves on said second frame part of said frame such that shifting of said clutch plates against one another prevents rotation of said sleeve shaft.

15. The drive system of claim 13, wherein said clutch plates are structured and arranged to interlock when said press disk is moved by the pressure medium passed through said opening in said flange and acting upon said outer face of said projection ring.

16. The drive system of claim 14, wherein said clutch/brake element further comprises a brake cylinder arranged in said frame, said brake cylinder having a spindle, a spring interposed between said press disk and said frame, and duct means arranged in connection with said frame for providing a pressure medium to acts on said spindle to release the effect of the spring force of said spring on said press disk.

17. The drive system of claim 16, wherein said duct means comprise a duct having a first portion arranged in said first frame part, a second portion arranged in said flange and a third portion arranged in said second frame part.

18. The drive system of claim 16, wherein said brake cylinder further comprises first and second piston parts connected to a respective end of said spindle, said second piston part being arranged between said press disk and said spring, said projection ring having an opening through which said spindle extends to engage said second piston part.

19. The drive system of claim 18, wherein said duct means terminate at said first piston part.

20. The drive system of claim 9, wherein the vehicle has a bogie having a swing beam pivotable in relation to a chassis of the vehicle, said frame being connected to the swing beam and having an interior in which said motor is arranged.

* * * * *